Sept. 29, 1964 R. B. RUSSELL 3,151,202
ELECTRODE HOLDER FOR ELECTRIC FURNACE ELECTRODES
AND METHOD OF REPAIRING SAME
Filed July 12, 1962 2 Sheets-Sheet 1

INVENTOR.
ROBERT B. RUSSELL
BY
Christy, Parmelee &
Strickland
his ATTORNEYS

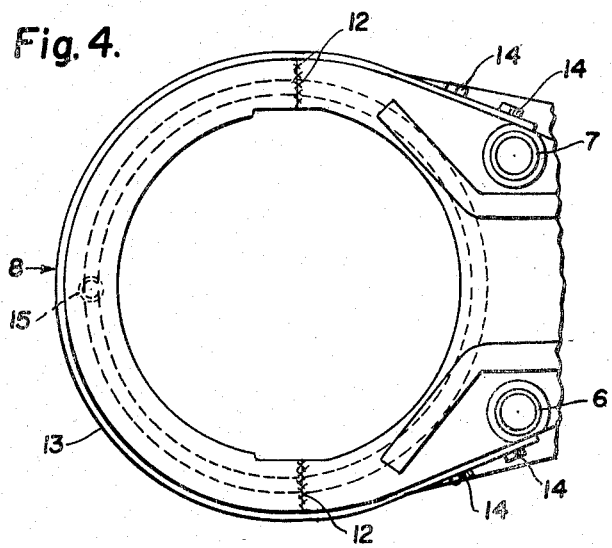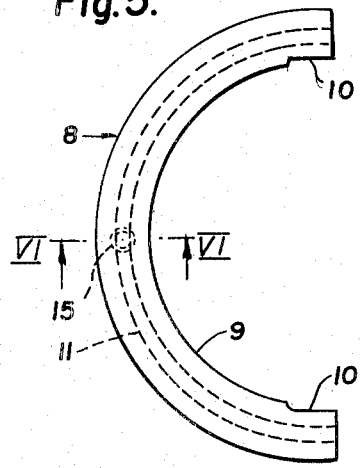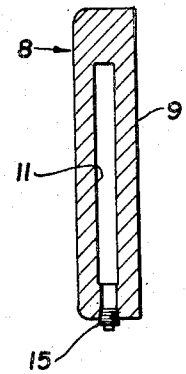

United States Patent Office 3,151,202
Patented Sept. 29, 1964

3,151,202
ELECTRODE HOLDER FOR ELECTRIC FURNACE ELECTRODES AND METHOD OF REPAIRING SAME
Robert B. Russell, Shaler Township, Allegheny County, Pa. (2609 Herron Lane, Glenshaw, Pa.)
Filed July 12, 1962, Ser. No. 209,410
2 Claims. (Cl. 13—15)

This invention relates to electrode holders for electric furnace electrodes and is for an improved electrode holder and an improved method of constructing or repairing such holders.

Electric arc furnace electrodes are formed cylindrical columns of bonded graphite or carbon several inches in diameter, and in use each electrode is supported in a holder through which electric current is conducted to it. The holders generally comprise a substantially cylindrical annulus with a laterally offset body through which the holder is mounted to a supporting structure and which serves also as a slideway for a bar that constitutes part of a wedge or clamping shoe arrangement. It is to this extension also that the current supply bases are clamped. The interior surface of the annulus opposite the extension is curved to fit against the cylindrical electrode and make contact therewith through an arc of about 180°, while the remaining wall of the annulus is curved about a larger radius so that there is a clearance space between this surface of the holder and the electrode. The wedging or clamping arrangement presses the electrode against the electrode contacting surface of the holder, but it may be released when the electrode is burned away far enough to require that the electrode be lowered relatively to the holder.

A conventional form of holder including the annulus and its offset body extension is an integral structure formed of copper. It may weight several hundred to as much as several thousand pounds. Generally it is formed as a casting and a helical coil of steel pipe is embedded in the annulus with water inlet and outlet terminals. In use the electrode passes through the cylindrical annulus and is wedged transversely of its length in a direction away from the body extension against the contacting surface on the inner face of the annulus. From time to time the clamp or wedge is loosened and the electrode is repositioned in the holder.

Each holder costs the user several thousand dollars. In use they contact the electrode at a level where the electrode is intensely hot—at a white heat. The contacting face of the annulus becomes pitted, arcing occurs between the contact face and the electrode, and the copper becomes "dead," that is, its conductivity decreases to a low level. To extend the useful life the present practice involves removal of the pitted and dead copper from the electrode contacting face of the holder and building up a new face by welding in copper and machining, or by inlaying a preformed copper layer into the surface which has been prepared by removal of the pitted and dead copper. In either case the electrical conductivity is impaired. Such impairment is due to oxygen inclusion in the metal filled in by welding, and due to increased electrical resistance at the interface of the new and old metal and the less favorable physical properties of the welded-in metal. In the case of the inlaid piece, the resistance at the interface of the new metal and the old impairs the electric conductivity, plus the fact that all of the poor copper cannot be removed. Efficiency is further impaired because copper has a positive coefficient of electrical resistance, its resistance increasing as its temperature increases, and there is a less favorable heat conducting path to the embedded water cooling coil with either welded-in or inlaid metal. If an electrode holder repaired by either of these methods holds up under normal use for a year, the expectations of the furnace operator are satisfied and the loss of efficiency is accepted as a necessary incident to getting longer use from the initial investment.

A primary object of the invention is to provide an improved electrode holder and especially a reconditioned holder, but applicable also to new construction.

A further object is to provide an improved method of reconditioning deteriorated electrode holders, which method enables the contact surface to be replaced a number of times.

These and other objects and advantages are secured by my invention. Generally it involves the complete severance from the holder of the electrode contacting surface of the annulus, including the cooling coils and replacing the section thus removed with a new cast copper segment of the same arcuate extent as that which is removed, the ends of the replacement section being butted against the two ends of the original annulus and silver brazed or welded hereto. The replacement segment or section has a single vertically-elongated water passage therethrough into which all of the severed coil ends open so that all the convolutions open into a single passage. The original water inlet and outlet connections are not disturbed. A strap of stainless steel or equally heat-resistant metal has its ends bolted to the original body of the holder and forms a yoke passing around the newly replaced segment to relieve any stress on the brazed joints or welds. In an experimental installation a holder thus repaired has shown little deterioration after three years of normal active use, exceeding the expected life of a new holder before repairs are necesasry. This is largely because of the more direct and efficient cooling. The electrical characteristics compare favorably with a new holder, silver brazing having been used to secure the new part to the old.

In the accompanying drawings:

FIG. 4 is a fragmentary view similar to FIG. 2 after repair has been made;

FIG. 5 is a plan view of the replacement segment; and

FIG. 6 is a transverse vertical section on the plane of line VI—VI of FIG. 5.

Figure 2:
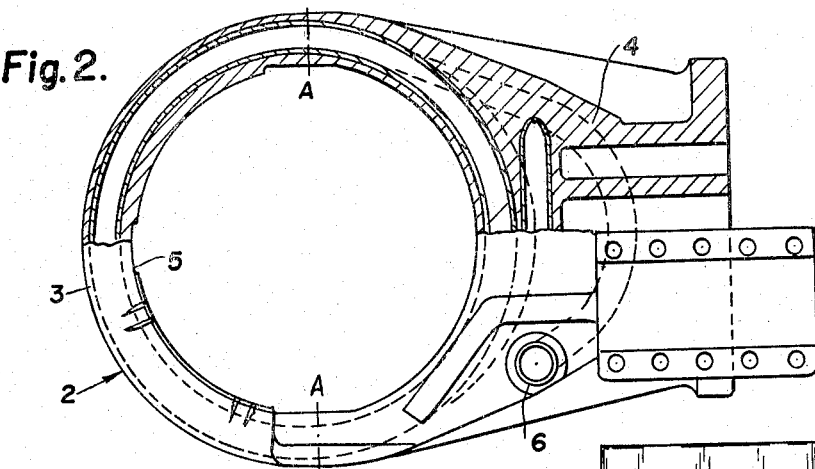
FIG. 2 is a top plan view of FIG. 1.
Figure 1:
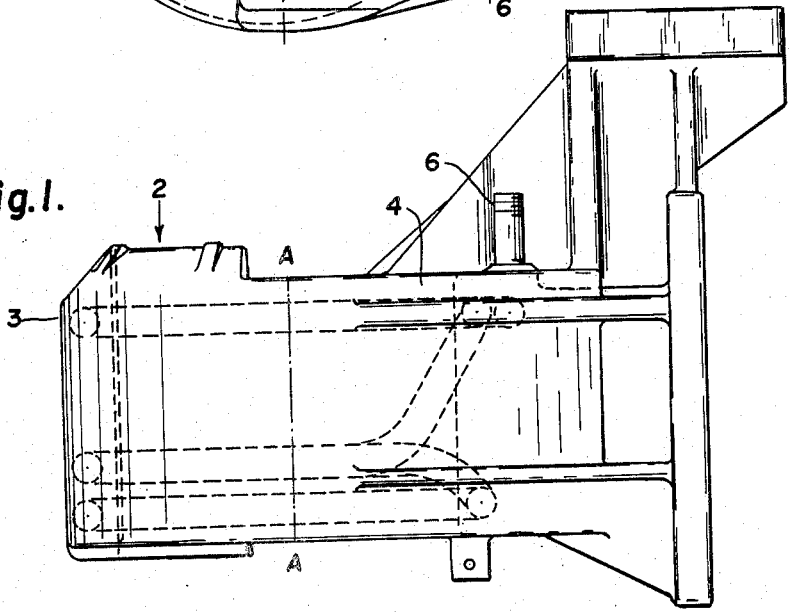
FIG. 1 is a side elevation of a typical electrode holder as now constructed, the dot-and-dash line indicating a line where the holder is severed for repair according to this invention.

Referring first to FIGS. 1 and 2 there is here shown a typical electrode holder such as is now in common use. The holder is designated generally as 2 and it has an annulus 3, the opening of which is designed to receive the electrode. Projecting laterally from the annulus at one side thereof is an extension 4 with the usual structure necessary for mounting the holder on the support on which it is carried. There is provided a passageway through this extension for guiding a movable element (not shown) constituting part of the electrode-holding wedge or shoe, and which is not here shown because it constitutes no part of the present invention.

Opposite the extension 4 the annulus has an electrode-contacting surface designated 5, the inner face of which is curved to fit accurately against the cylindrical wall of an electrode passing through the annulus. This electrode-contacting surface extends through an arc of approximately 180°. The remaining wall of the annulus, while substantially concentric with the electrode, is curved about a larger radius so as to provide a clearance space between the annulus and the electrode for the accommodation of the wedge mechanism. In the normal use of the holder, pressure is applied by a plunger or wedging device (not shown) contained within the extension 4 against the electrode, pushing the electrode transversely of its length into tight contact with the surface 5.

The whole body of the holder is an integral copper casting, and the top of this casting provides the clamps for conductors which supply current to the holder. Cast into the annulus is a water-cooling coil, the convolutions of which must be unevenly spaced so as to clear the passageway through the holder in which the wedge-operating mechanism is contained. One end of this coil leads to an inlet connection 6 at one side of the longitudinal axis of the body portion 4 and the other end of the coil connects to an outlet nipple or extension 7 at the opposite side of the longitudinal axis of said body portion.

As explained above, in the normal use of this holder the electrode is pressed tightly against the surface 5 and the flow of electric current is mainly between the surface 5 and the body of the electrode. It is this surface which becomes pitted and in which the copper becomes dead, rendering the holder inefficient.

According to the present invention the annulus of the electrode holder is cut in two on a plane located just inside the ends of the portion 5 of the annulus, that is, at substantially the plane of the lines A—A in FIGS. 1 and 2. This cutting is preferably done with a saw so as to make a clean square surface and in so cutting off the outer portion of the annulus the convolutions of the cooling coil are also cut. Thus the entire electrode-contacting portion or segment of the annulus with short ends of the remaining part of the annulus is completely removed from the holder.

When this section or segment has been removed a replacement section, designated generally as 8 of the same overall dimensions as the piece which has been removed, has its ends butted against the sawed-off ends of the original body. The replacement section is made of cast copper and it has a thick electrode-engaging portion 9, the inner surface of which is curved to conform to the curvature of the electrode, and there are terminal portions 10 that butt against the body of the holder at the places where the original segment was cut away. The replacement section 8 has a passageway 11 extending therethrough from one end 10 to the other, this passageway opening at each end of the replacement section. The vertical height of the passageway is the full height of the cooling coil that was originally present in the removed segment, so that all of the pipe ends in the original body to which this replacement segment is applied register with and open into this wide passageway. Where the ends of the replacement segment abut against the ends of the annulus on the body portion of the original holder, the replacement segment is silver brazed or copper welded to make a water-tight seal and a good electrical conducting path from the body of the holder into the replacement segment.

Figure 3:
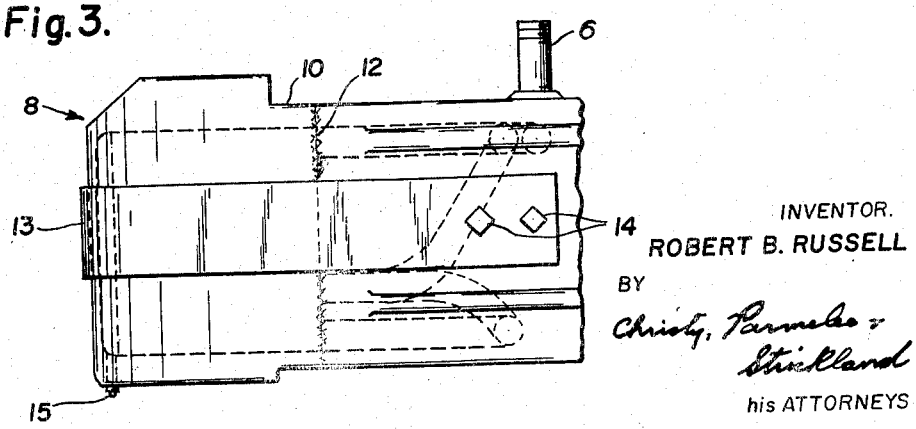
FIG. 3 is a side view of the holder of FIG. 1 after it has been repaired in accordance with this invention.

In FIGS. 3 and 4 these brazed joints or welds are indicated at 12. After the replacement segment has been secured in place by brazing or welding, a stainless steel strap or strap of other heat-resistant metal is passed around the replacement segment as indicated at 13 and its ends are bolted at 14 to the sides of the extension 4 of the holder. This strap relieves the brazed or welded joint from being overstressed when the electrode is wedged in place in the reconditioned holder.

Whereas the original holder had an embedded cooling coil around the entire annulus, the reconditioned holder has an integral water passage extending throughout the greater portion of the height thereof. This water cooling passage is directly behind and almost coextensive in area with the electrode-contacting surface of the holder. Heat is more effectively removed from the electrode-contacting surface because the area through which cooling water is circulated is more extensive with the electrode contacting surface than in the original structure where the convolutions of the cooling coil were at the top and bottom only of the annulus and the central area of the electrode contacting surface is further removed from the water. The cooling is also more efficient because the heat is transferred directly from the copper to the water, whereas the coil provided in the original holder is formed of a ferrous metal and has a lower coefficient of heat conductivity than copper and thus impedes the transfer of heat from the copper to the water. Water can still circulate from the original inlet nipple 6 to the outlet nipple 7, and the portions of the original coil in the body part of the holder will still be supplied with flowing water. Since this part of the holder, however, does not contact the electrode, it does not matter that the cooling is less efficient or extensive than in the replacement section.

The more effective water cooling of the replacement section is important because copper has a positive coefficient of resistance, its resistance increasing with an increase in temperature. Therefore by the more effective cooling of the copper, the more effective is the transfer of energy into the electrode. Also by reason of the more effective cooling, the life of the copper is prolonged and pitting and arcing between the electrode-contacting surface and the electrode is reduced.

The electrode holder, when it eventually does again have the electrode-contacting surface become too badly deteriorated for further use, can again be sawed off on the line A—A and the first replacement segment can be removed and a second replacement segment put in, and this can be done an indefinite number of times.

In the drawings I have shown a clean-out plug 15 in the bottom of the replacement section of the annulus so that muck and accumulations that form after the holder has been in use for a period of time can be flushed out.

The replacement section of the annulus can be cast the same as the original holder was cast so that it has the same density and metallurgical properties as the original holder and by using silver brazing to join the replacement segments to the original body there is little electrical resistance at the interface of the new and old parts so that from the standpoint of electrical conductivity the reconditioned holder is the same or close to the same as the original.

While I have shown and described one particular holder and illustrated one embodiment of my invention, it will be understood that this is by way of illustration and that various changes and modifications may be made within the contemplation of my invention and under the scope of the following claims.

I claim:

1. A reconditioned electrode holder for electric arc furnaces comprising an original body portion with an integral segment of a cylindrical electrode encircling annulus thereon, said segment being of a diameter greater than the diameter of the electrode for which the holder is designed, a one-piece replacement segment having terminal portions butted against the ends of the integral segment and bonded thereto by a metallic bond, the original integral segment having portions of a water cooling coil embedded therein with the several convolutions terminating at the ends of the integral segment, the replacement segment having a single vertically-elongated water passageway extending therethrough from end to end, all of the coil ends at both ends of the integral segment opening into the confronting ends of the said passageway in the replacement segment, and a reinforcing strap encircling the replacement segment having its ends fixed to the body portion of the holder, the replacement segment having an inner face curved about a shorter radius than the first-named original segment for contact with an electrode received in the holder.

2. The method of reconditioning an electric arc furnace electrode holder of the type having an integral cylindrical annulus and an offset body portion integral therewith, the annulus having an electrode contacting segment extending partway around it and another segment curved about a larger radius, the latter portion of the annulus being the part from which said body extends, said annulus having a coil of several convolutions embedded therein for the circulation of cooling water therethrough, the ends of the coil terminating in connector nipples on said body portion, said method comprising the steps of cutting away a complete segment of the annulus including the entire electrode contacting segment and portions of the segment of larger radius together with severing the convolutions of the coil where such cutting is effected, replacing the segment so removed with an integral segment of similar dimensions and contour to the removed segment and with their faces abutting the severed ends of the original remaining portion, the replacement section having a confined water passage therearound into which the several coil convolutions of the original segment open, bonding the ends of the replacement segment to the ends of the remaining portion of the original section with a fused metallic bond to provide a water-tight good electrical conducting connection between the replacement section and the remaining part of the original segment, and then strapping the replacement segment to the body with a heat-resistant metal band that passes around the replacement segment and attaching its two ends to the original section at places removed from the joint between the original and replacement sections to relieve the connection between the replacement section and the original of excessive mechanical stress when an eletcrode is clamped in the holder.

References Cited in the file of this patent

UNITED STATES PATENTS

| | | |
|---|---|---|
| 2,747,264 | Buvelot | May 29, 1956 |
| 2,997,511 | Turner | Aug. 22, 1961 |